United States Patent
Yokoyama et al.

(10) Patent No.: US 9,500,271 B2
(45) Date of Patent: Nov. 22, 2016

(54) SPROCKET AND CHAIN TRANSMISSION MECHANISM

(71) Applicant: TSUBAKIMOTO CHAIN CO., Osaka-shi, Osaka (JP)

(72) Inventors: Masanori Yokoyama, Osaka (JP); Tsuyoshi Kabai, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 169 days.

(21) Appl. No.: 14/619,432

(22) Filed: Feb. 11, 2015

(65) Prior Publication Data

US 2015/0240932 A1    Aug. 27, 2015

(30) Foreign Application Priority Data

Feb. 24, 2014    (JP) .................................. 2014-033229

(51) Int. Cl.
*F16H 55/30* (2006.01)
*F16H 7/06* (2006.01)

(52) U.S. Cl.
CPC ................. *F16H 55/30* (2013.01); *F16H 7/06* (2013.01); *F16H 2055/306* (2013.01)

(58) Field of Classification Search
CPC .......... F16H 7/023; F16H 7/06; F16H 55/30; F16H 55/08; F16H 2055/306
See application file for complete search history.

(56) References Cited

U.S. PATENT DOCUMENTS

| | | | | |
|---|---|---|---|---|
| 4,148,225 A * | 4/1979 | Redmond, Jr. | ......... | F16H 7/023 474/148 |
| 5,848,948 A * | 12/1998 | Allen | ......... | F16H 7/06 474/156 |
| 7,128,673 B2 * | 10/2006 | Kubo | ......... | F16H 55/30 474/152 |
| 7,534,182 B2 * | 5/2009 | Sonoda | ......... | F16H 55/08 474/152 |
| 2005/0272545 A1 * | 12/2005 | Yamanishi | ......... | B22F 3/164 474/152 |
| 2007/0087878 A1 * | 4/2007 | Ogawa | ......... | F16H 55/30 474/156 |
| 2008/0161144 A1 * | 7/2008 | Hirai | ......... | F16H 55/08 474/141 |
| 2009/0286640 A1 * | 11/2009 | Sakura | ......... | F16H 55/08 474/153 |

FOREIGN PATENT DOCUMENTS

| | | |
|---|---|---|
| JP | 2005-30501 A | 2/2005 |
| JP | 2005-249166 A | 9/2005 |
| JP | 2006-170362 A | 6/2006 |
| JP | 2007-107617 A | 4/2007 |
| JP | 2008-164045 A | 7/2008 |
| JP | 2009-275788 A | 11/2009 |

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

Provided are a sprocket and a chain transmission mechanism configured such that noise and vibrations caused by the elongation of the chain and also wear of parts are reduced, the decrease in the meshing strength of the chain and the sprocket is inhibited, and the chain service life is extended. The sprocket and chain transmission mechanism each have bottom land portion arcs of a predetermined radius and a predetermined angular range between a plurality of teeth to be meshed with the chain. The radius of each of the bottom land portion arcs satisfies the following relationship with the diameter of a roller or a bush of the meshing chain: $Rb > 0.505 * \phi r + 0.069 * \phi r^{1/3}$ (where Rb is the bottom land portion arc radius, and $\phi r$ is the diameter of the roller or the bush of the meshing chain).

6 Claims, 4 Drawing Sheets

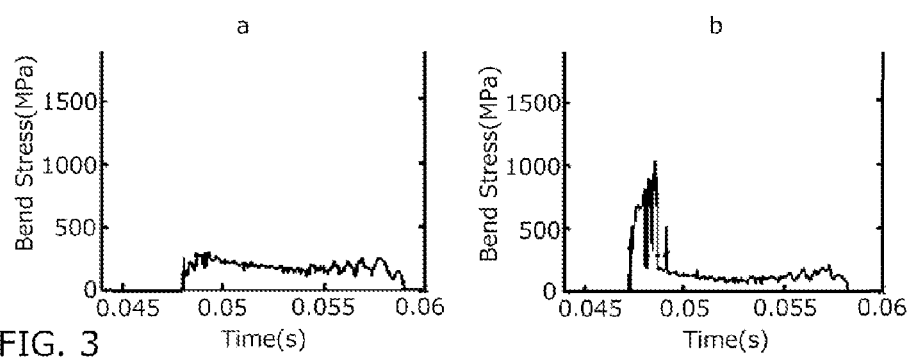
FIG. 3
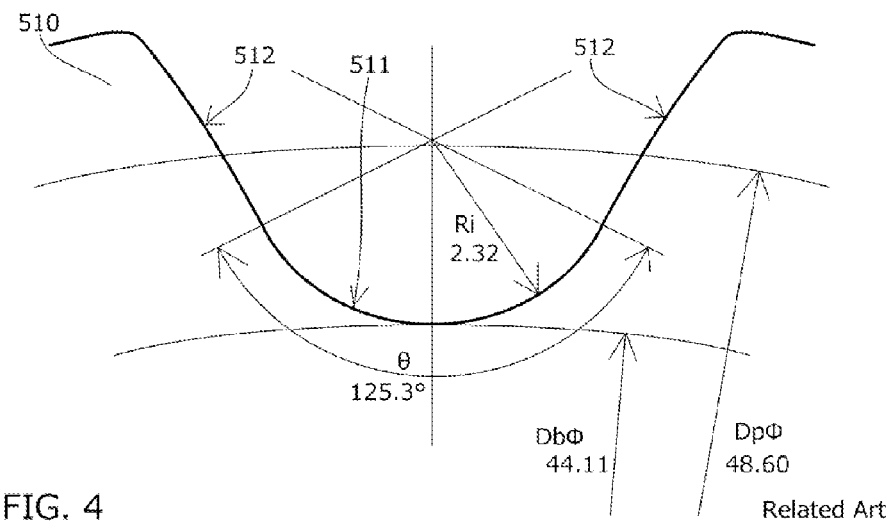
FIG. 4            Related Art

SPROCKET AND CHAIN TRANSMISSION MECHANISM

BACKGROUND OF THE INVENTION

1. Field of the Invention

The present invention relates to a sprocket provided with a plurality of teeth to be meshed with a chain, and having bottom land portions between the plurality of teeth, each bottom land portion being centered on a tooth bottom and constituted by part of a cylindrical surface of a predetermined curvature radius and a predetermined angular range, and also relates to a chain transmission mechanism having such a sprocket.

2. Description of the Related Art

ISO 606: 1994 (E) stipulates a sprocket tooth profile (referred to hereinbelow as ISO tooth profile) as the conventional standard sprocket of a chain transmission mechanism.

In the ISO tooth profile, as depicted in FIG. 6, where a chain pitch is denoted by p, a pitch diameter is denoted by $Dp\phi$, a roller (bush in the case of a bush chain; same hereinbelow) diameter is denoted by $\phi r$, a bottom land portion arc radius is denoted by Rb, a tooth surface radius is denoted by Rs, a root circle diameter is denoted by $Db\phi$, and the number of teeth in the sprocket is denoted by z, the relationships therebetween are defined by the following equations.

$$Dp\phi = p/\sin(180°/z)$$

$$Db\phi = Dp\phi - \phi r$$

$$Rb(\min) = 0.505 \phi r$$

$$Rb(\max) = 0.505 \phi r + 0.069(\phi r)^{1/3}$$

$$Rs(\min) = 0.008 \phi r(z^2 + 180)$$

$$Rs(\max) = 0.12 \phi r(z + 2)$$

As follows from the equations above, in the ISO tooth profile, a bottom land portion 511 of teeth 510 is formed by an arc of a bottom land portion arc radius Rb which is slightly larger than the radius ($\phi r/2$) of the roller.

Further, the root circle diameter $Db\phi$ is formed to be equal to a difference between the pitch diameter $Dp\phi$ and the roller diameter $\phi r$, and the root circle diameter $Db\phi$ is also formed to be substantially equal to a difference between the pitch diameter $Dp\phi$ and a two-fold bottom land portion arc radius Rb.

As depicted in FIG. 7A, the standard sprocket 500 is defined as a sprocket in which each roller 521 sits on the center of the bottom land portion 511 when the roller chain 520 is wound therearound.

Since the rollers 521 successively mesh with the bottom land portions 511 of the sprocket 500, the roller chain 520 performs the polygonal movement, vibrates by moving (pulsating) in the vertical direction, and generates noise. Further, in the polygonal movement, the speed in the advance direction of the roller chain 520 also changed.

In order to reduce such vibrations, noise and changes in speed, chain transmission mechanisms using a sprocket with specifications different from those of the above-described standard sprocket 500 have been suggested (see, for example, Japanese Patent Application Publications Nos. 2005-30501, 2005-249166, 2006-170362, 2007-107617, 2008-164045, and 2009-275788).

SUMMARY OF THE INVENTION

However, although the sprockets of the well-known chain transmission mechanisms effectively decrease changes in speed of the roller chain caused by the polygonal movement and reduce the vibrations, they do not take into account that the elongation of the chain changes the position in which the roller initially comes into contact with the sprocket and the seat position when the roller sits on the bottom land portion.

Actually, the pitch of the chain increases due to the elongation caused by tension and also elongation caused by changes with time and wear of sliding parts. In this case, as depicted in FIG. 7B, a problem arises in that a position 513 in which the roller 521 comes into contact with the sprocket 500 changes, the roller comes into contact with a higher position on the tooth side surface 512 which is outside the bottom land portion 511, and large impacts occur.

This problem is created not only by the standard sprocket 500, but also by the aforementioned well-known non-standard sprockets, and it results in increased meshing sound.

Further, such impacts cause wear of meshing portions of the chain or sprocket and also generate large forces acting upon other sliding parts of the chain, cause wear, and shorten the service life of the chain and sprocket.

When the chain pitch further increases due to elongation caused by changes with time and wear of sliding parts, the rollers remain seated at high positions on the tooth side surface outside the bottom land portions in the portions where the chain is wound around the sprocket.

Where such a state is reached, a problem arises in that the meshing strength of the chain and sprocket decreases, the meshing noise increases, the wear of teeth and rollers increases, and the teeth start jumping.

The present invention resolves the above-described problems inherent to the related art and provides a sprocket and a chain transmission mechanism configured such that noise and vibrations caused by the elongation of the chain and also wear of parts are reduced, the decrease in the meshing strength of the chain and the sprocket is inhibited, and the chain service life is extended.

The present invention resolves the problems by providing a sprocket that includes a plurality of teeth to be meshed with a chain and has bottom land portion arcs of a predetermined radius and a predetermined angular range between the plurality of teeth, wherein the radius of each of the bottom land portion arcs satisfies the following relationship with a diameter of a roller or a bush of the meshing chain: $Rb > 0.505 * \phi r + 0.069 * \phi r^{1/3}$ (Rb is the bottom land portion arc radius, and $\phi r$ is the diameter of the roller or the bush of the meshing chain).

The present invention resolves the problems by providing a chain transmission mechanism that includes a chain and a sprocket including a plurality of teeth meshing with rollers or bushes of the chain, wherein bottom land portion arcs of a predetermined radius and a predetermined angular range are provided between the plurality of teeth of the sprocket; and the radius of each of the bottom land portion arcs satisfies the following relationship with a diameter of each of the rollers or bushes of the chain: $Rb > 0.505 * \phi r + 0.069 * \phi r^{1/3}$ (where Rb is the bottom land portion arc radius, and $\phi r$ is the diameter of the roller or the bush of the chain).

In the sprocket of the invention as in claim 1 and the chain transmission mechanism of the invention as in claim 6, the radius of the bottom land portion arc satisfies the following relationship with a diameter of the roller or the bush of the chain: $Rb > 0.505 * \phi r + 0.069 * \phi r^{1/3}$ (where Rb is the bottom land portion arc radius, and $\phi r$ is the diameter of the roller or the bush of the chain). Thus, as a result of making the bottom land portion arc radius larger than the maximum value of the bottom land portion arc radius of the standard sprocket, even when the chain pitch increases due to the elongation caused by tension and changes with time and wear of sliding parts, the roller or bush comes into contact with the bottom land portion, without coming into contact with the tooth side surface, during meshing and can sit on the bottom land portion, the noise, vibrations, and wear of parts can be reduced, the decrease in the meshing strength of the chain and sprocket can be inhibited, and the chain service life can be extended.

With the configuration set forth in claim 2, the center of the bottom land portion arc radius is positioned on an outer circumferential side with respect to the center of a bottom land portion arc radius of a standard sprocket. As a result, even when the bottom land portion arc radius is increased, the decrease in the root circle diameter of the sprocket can be inhibited and changes in the seating position in the case of a small elongation of the chain pitch can be inhibited. Therefore, the noise, vibrations, and wear of parts can be reduced, the decrease in the meshing strength of the chain and sprocket can be inhibited, and the chain service life can be extended.

With the configuration set forth in claim 3, the root circle diameter of the sprocket is equal to or greater than the root circle diameter of the standard sprocket. As a result, the seating position in a state without chain elongation can be shifted in advance in reverse, and changes in the seating position can be inhibited even when the chain pitch further increases.

With the configuration set forth in claim 4, the difference between the bottom land portion arc radius Rb and the bottom land portion arc radius Ri of the standard sprocket is greater than half of a difference between the root circle diameter and the root circle diameter of the standard sprocket. As a result, a large correspondence margin of the seating position can be taken when the chain elongates and the pitch further increases, while shifting in advance the seating position in a state without chain elongation in reverse, and a larger chain elongation can be accommodated.

With the configuration set forth in claim 5, the angular range of the bottom land portion arc is equal to the angular range of the bottom land portion arc of the standard sprocket. As a result, the shape of the tooth side surface can be made the same as that of the standard sprocket, and the operation same as that of the standard sprocket can be ensured even when the roller or bush is in contact with the tooth side surface during meshing.

BRIEF DESCRIPTION OF THE DRAWINGS

FIG. 3 is a property graph of the sprocket according to the first embodiment of the present invention;

FIG. 4 is a specification drawing of a standard sprocket;

DESCRIPTION OF THE PREFERRED EMBODIMENTS

The specific implementation mode of the present invention is not particularly limited, provided that in the sprocket comprising a plurality of teeth to be meshed with a chain and having bottom land portion arcs of a predetermined radius and a predetermined angular range between the plurality of teeth, and in the chain transmission mechanism using such a sprocket, the radius of each of the bottom land portion arcs satisfies the following relationship with the diameter of the roller or bush of the meshing chain: $Rb > 0.505 * \phi r + 0.069 * r^{1/3}$ (where Rb is the bottom land portion arc radius, and $\phi r$ is the diameter of the roller or the bush of the meshing chain), noise and vibrations caused by the elongation of the chain and also wear of parts are reduced, the decrease in the meshing strength of the chain and the sprocket is inhibited, and the chain service life is extended.

Example 1

Figure 1:
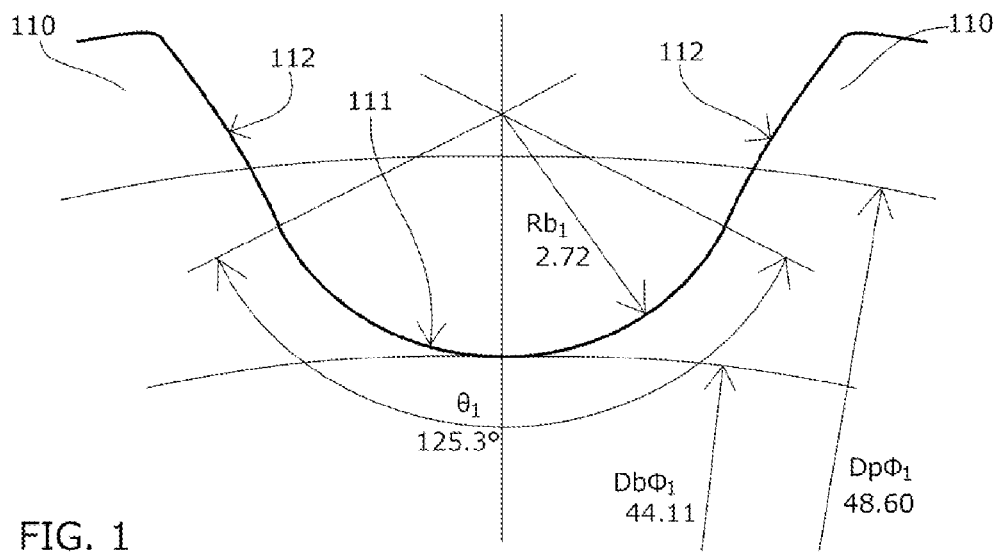
FIG. 1 is a specification drawing of a sprocket according to the first embodiment of the present invention.

A sprocket 100 which is the first embodiment of the sprocket and chain transmission mechanism in accordance with the present invention is designed to mesh with a roller chain 120 with a roller diameter of $\phi r_1 = 4.49$ mm. As depicted in FIG. 1, the sprocket has the following specifications.

Pitch diameter: $Dp\phi_1 = 48.60$ mm
Bottom land portion arc radius: $Rb_1 = 2.72$ mm
Bottom land portion arc angle: $\theta_1 = 125.3°$
Root circle diameter: $Dp\phi_1 = 44.11$ mm
Number of teeth in the sprocket: $z_1 = 19$ The "roller" and "roller chain" may be "bush" and "bush chain" (same hereinbelow).

Figure 2:
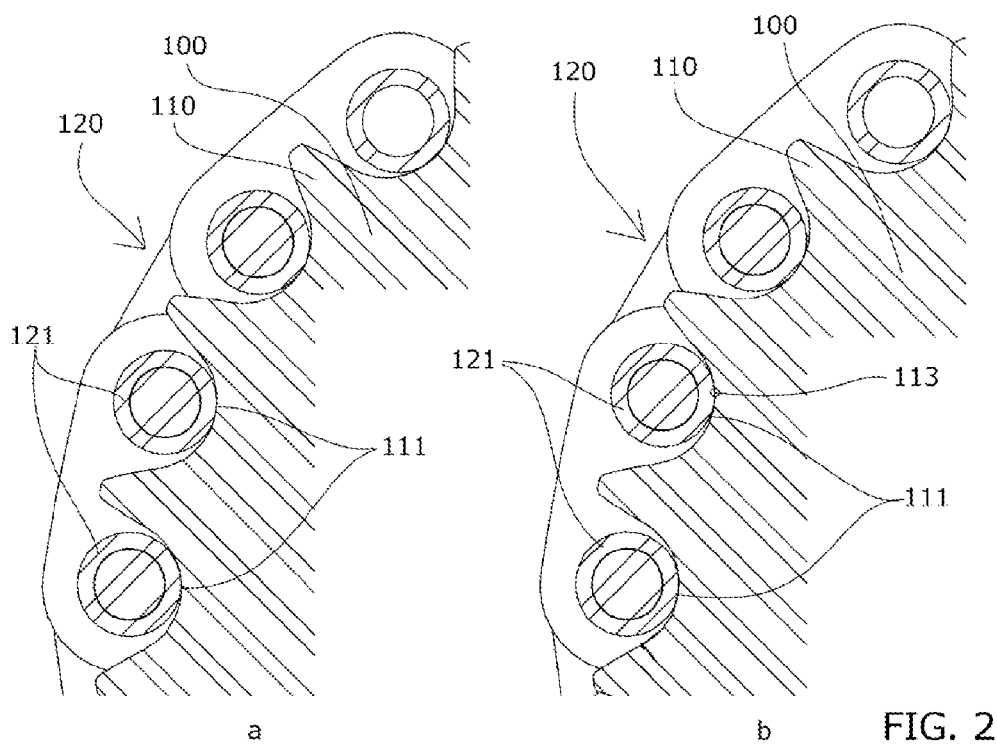
FIG. 2 is a partial side sectional view of the sprocket according to the first embodiment of the present invention.

When the roller chain 120 is not elongated at all, as shown in FIG. 2A, all of the rollers 121 of the roller chain 120 mesh with substantially central sections of bottom land portions 111 of the sprocket 100, in the same manner as in a standard sprocket 500.

Where the pitch of the roller chain 120 has increased due to elongation under tension, elongation caused by changes with time, and wear of sliding parts, as shown in FIG. 2B, positions 113 where the rollers 121 and the sprocket 100 are in contact with each other change. However, since a large arc radius $Rb_1$ of the bottom land portion is set, noise and vibrations caused by the elongation of the chain and also wear of parts are reduced, the decrease in the meshing strength of the chain and the sprocket is inhibited, and the chain service life is extended, while preventing the rollers 121 from withdrawing from the bottom land portion 111 and coming into contact with the tooth side surfaces 112.

FIG. 3 depicts the comparison results obtained in stress analysis in the case (a) in which the sprocket 100 of the present embodiment is used and the case (b) in which the standard sprocket is used.

When the sprocket of the present embodiment is used, the occurrence of a peak stress is clearly inhibited, thereby reducing noise and vibrations.

As depicted in FIG. 4, the standard sprocket 500 used for comparison has the following specifications:

Pitch diameter: $Dp\phi_1 = 48.60$ mm
Bottom land portion arc radius: $Ri = 2.32$ mm
Bottom land portion arc angle: $\theta = 125.3°$ Root circle diameter: $Db\phi$=44.11 mm
Number of teeth in the sprocket: z=19

Example 2

Figure 5:
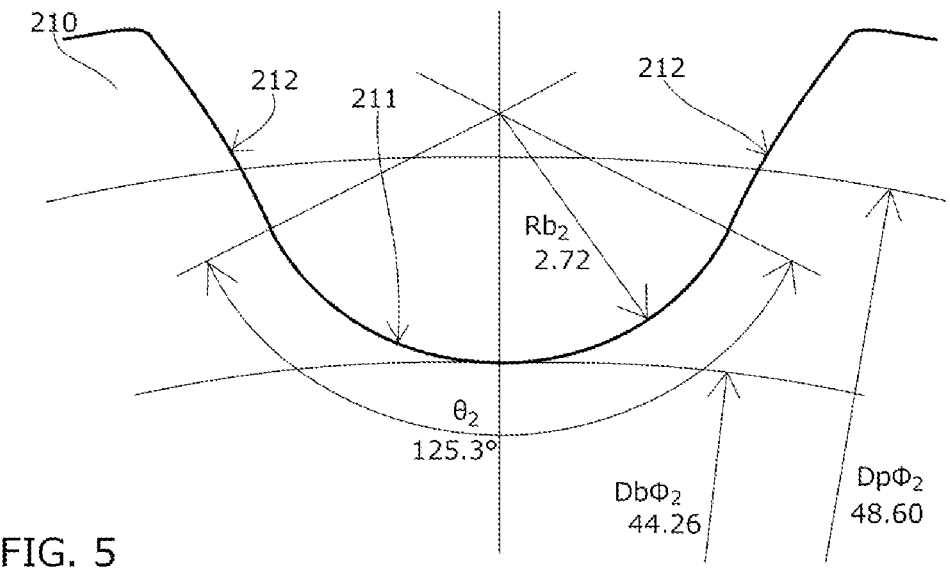
FIG. 5 is a specification drawing of a sprocket according to the second embodiment of the present invention.
Figure 6:
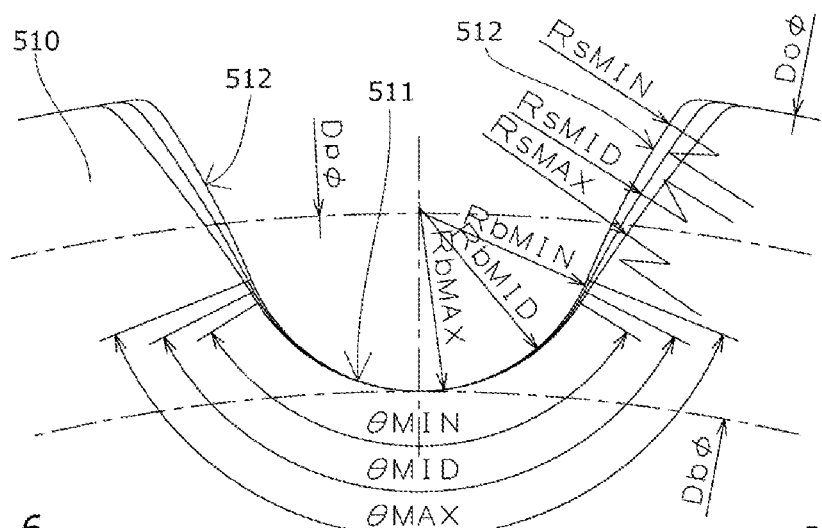
FIG. 6 is an explanatory drawing illustrating the specifications of a sprocket.
Figure 7:
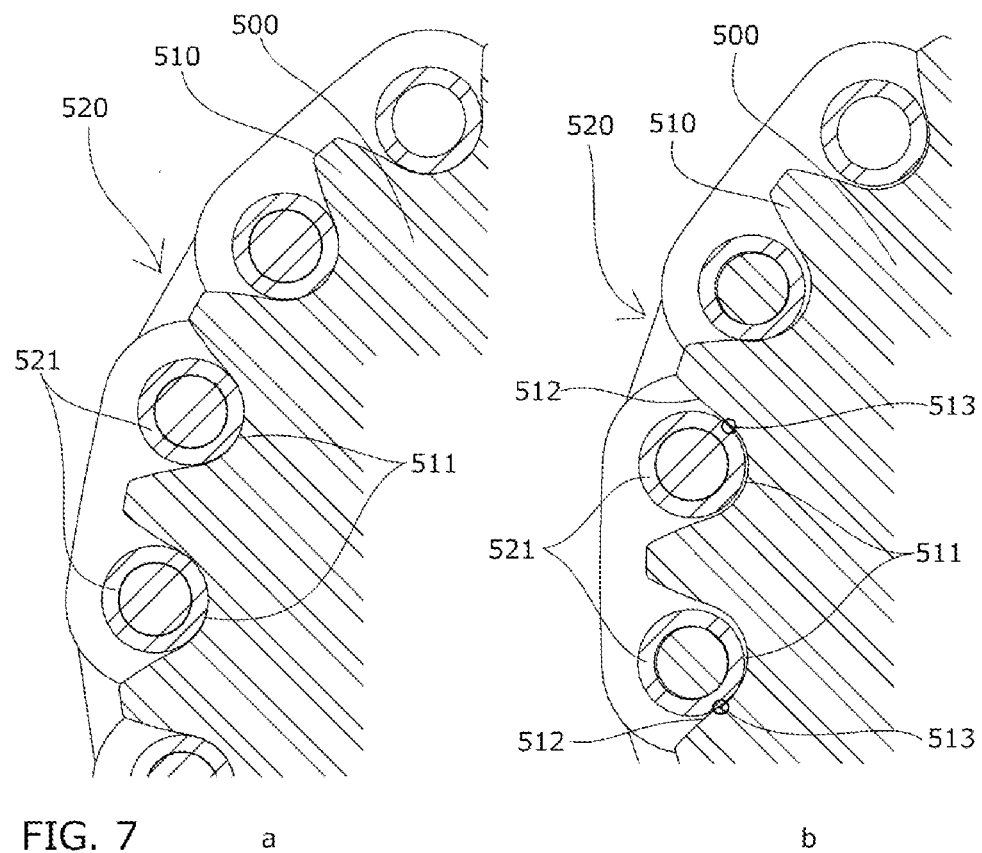
FIG. 7 is an explanatory drawing illustrating how a chain is engaged with the standard sprocket.

A sprocket 200 which is the second embodiment of the sprocket and chain transmission mechanism in accordance with the present invention is designed to mesh with a roller chain with a roller diameter of $\phi r_1$=4.49 mm. As depicted in FIG. 5, the sprocket has the following specifications.

Pitch diameter: $Dp\phi_2$=48.60 mm
Bottom land portion arc radius: $Rb_2$=2.72 mm
Bottom land portion arc angle: $\theta_2$=125.3°
Root circle diameter: $Db\phi_2$=44.26 mm
Number of teeth in the sprocket: $z_2$=19

The specifications of the sprocket 200 of the present embodiment satisfy the following relationships with the bottom land portion arc radius Ri=2.32 mm and root circle diameter $Db\phi$=44.11 mm of the standard sprocket.

$$Db\phi_2=44.26 \text{ mm}>Db\phi=44.11 \qquad \text{Equation 1}$$

$$Rb_2-Ri=0.4>(Db\phi_2-Db\phi)/2=0.075 \qquad \text{Expression 2}$$

In a state in which the roller chain is not elongated at all, since the relationship of Equation 1 is fulfilled, the position where the roller and the sprocket 200 are in contact with each other is shifted in the reverse direction with respect to that in the first embodiment, but since the bottom land portion arc radius $Rb_2$ is set to be large, as follows from the relationship represented by Expression 2, the roller 221 is prevented form withdrawing from the bottom land portion 211 and coming into contact with the tooth side surface 212.

Further, where the roller chain is slightly elongated, all of the rollers of the roller chain mesh with substantially central sections of the bottom land portions 211 of the sprocket 200, and where the roller chain is further elongated, the positions where the rollers are in contact with the sprocket 200 change in the same manner as in the first embodiment.

In this case, since the relationship represented by Equation 1 is fulfilled, the positions where the rollers are in contact with the sprocket 200 when there is no elongation are shifted in the reverse direction. Therefore, even where the roller chain further elongates by comparison with the first embodiment, the positions where the rollers are in contact with the sprocket 200 can be maintained in the bottom land portions 211.

What is claimed is:

1. A sprocket comprising a plurality of teeth to be meshed with a chain and having bottom land portion arcs of a predetermined radius and a predetermined angular range between the plurality of teeth, wherein
the radius of each of the bottom land portion arcs satisfies the following relationship with a diameter of a roller or a bush of the meshing chain:

$$Rb>0.505*\phi r+0.069*\phi r^{1/3},$$

where Rb is the bottom land portion arc radius, and
$\phi r$ is the diameter of the roller or the bush of the meshing chain.

2. The sprocket according to claim 1, wherein
a center of the bottom land portion arc radius is positioned on an outer circumferential side with respect to a center of a bottom land portion arc radius of a standard sprocket, the bottom land portion arc radius of the standard sprocket being represented by:

$$Ri=0.505*\phi r+0.069*\phi r^{1/3},$$

where Ri is the bottom land portion arc radius of the standard sprocket, and
$\phi r$ is the diameter of the roller or the bush of the meshing chain.

3. The sprocket according to claim 1, wherein
a root circle diameter of the sprocket is equal to or greater than a root circle diameter of a standard sprocket.

4. The sprocket according to claim 3, wherein
a difference between the bottom land portion arc radius Rb and the bottom land portion arc radius Ri of the standard sprocket is greater than half of a difference between the root circle diameter and the root circle diameter of the standard sprocket.

5. The sprocket according to claim 1, wherein an angular range of the bottom land portion arc is equal to an angular range of a bottom land portion arc of a standard sprocket.

6. A chain transmission mechanism comprising a chain, and a sprocket including a plurality of teeth meshing with rollers or bushes of the chain, wherein
bottom land portion arcs of a predetermined radius and a predetermined angular range are provided between the plurality of teeth of the sprocket; and
the radius of each of the bottom land portion arcs satisfies the following relationship with a diameter of each of the rollers or bushes of the chain:

$$Rb>0.505*\phi r+0.069*\phi r^{1/3},$$

where Rb is the bottom land portion arc radius, and
$\phi r$ is the diameter of the roller or the bush of the chain.

* * * * *